3,323,459
THERMAL THRESHOLD RESPONSIVE DEVICES
Paul Buffet, Montefermeil, France, assignor to
l'Electronique Appliquee, Paris, France
Continuation of application Ser. No. 84,281, Jan. 23, 1961.
This application Jan. 15, 1965, Ser. No. 427,540
Claims priority, application France, Jan. 28, 1960,
817,132
8 Claims. (Cl. 102—70.2)

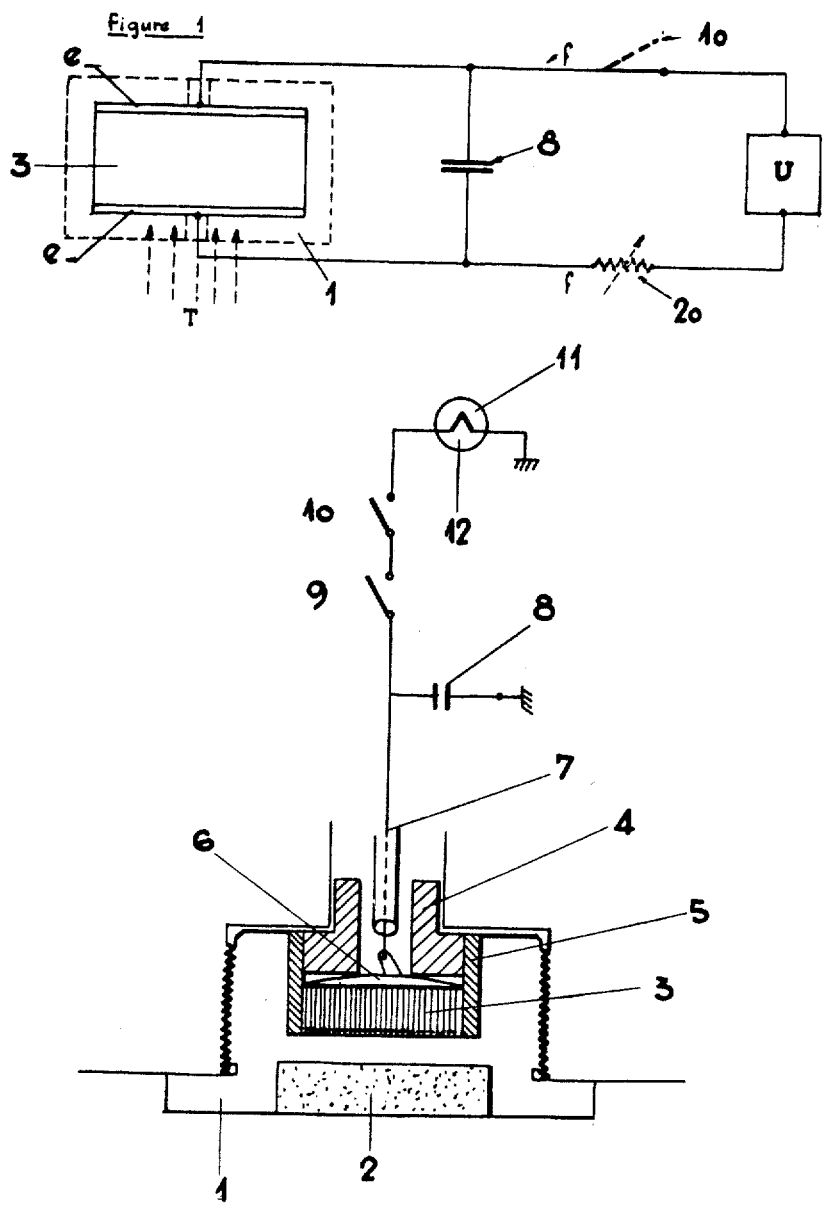

This is a continuation of my copending application Ser. No. 84,281 filed Jan. 23, 1961, and now abandoned.

The present invention concerns improved thermal threshold responsive devices for locally detecting a rise of temperature exceeding a threshold value and locally or remotely actuating therefrom at least one electrical current responsive member.

According to a feature of the invention, said devices are made with a slab of pyroelectric ceramic material provided with electrodes on opposite faces thereof and submitted to the thermal phenomenon so that, upon exceeding the Curie temperature point of said material, a sudden peak of current of high electrical intensity is generated in a circuit from leads connected to said electrodes to at least one electrical current responsive member, as it is known that such a material which presents a dielectric polarization suddenly looses said polarization when its temperature exceeds said Curie point and consequently releases such a high electrical charge. Considering for instance slabs of such materials having a diameter of about 2 centimeters, the following examples may be given for defining such a special property thereof:

Barium titanate slabs, when exceeding in a relatively rapid rise of temperature, the temperature of 125° C., release an electrical charge of about 20 micro-coulombs;

Barium and lead titanate slabs, when exceeding 150° C., release an electrical charge of about 25 micro-coulombs;

Niobium, sodium and cadmium oxide slabs, when exceeding 220° C., release an electrical charge of about 45 micro-coulombs;

Zirconate ceramic slabs, when exceeding 350° C., release an electrical charge of about 85 micro-coulombs.

According to the character of the electrical current responsive member embodied in such devices, and the length of the leads between the slab electrodes and the said member terminals, local or remote indication, alarm and control arrangements are obtained when putting the invention into practice.

According to a further feature of the invention, in said devices, the slab is enclosed within a heat-delaying housing whereby spurious transient heat effects are avoided.

According to a further feature of the invention, a shunt condenser is connected across the leads to the current responsive member in the device.

These and further features of the invention will be detailed with reference to the accompanying drawings, wherein:

FIG. 1 shows the general diagram of a device according to the invention; and

FIG. 2 shows a particular embodiment of special advantage of the invention, as applied to a delayed firing of an explosive powder charge.

Referring to FIG. 1, the ceramic slab of the defined character is shown at 3 with its two electrodes e connected through leads f to a current responsive device or member U. A condenser 8 is connected across the two leads f. In a dotted line in one of said leads is shown a single-throw switch 10. The slab 3 may receive heat through the wall of a housing 1 when a thermal phenomenon is applied to said housing as illustratively indicated by arrows T. In a dotted line, in the other lead is shown at 20 an adjustable electrical resistor which may or not be inserted in the circuitry as the case may be.

To explain the operation of the device, it will be first assumed that U is a mere high impedance indicator with resistor 20 inserted in the lead f for protection against overcurrent peaks, and it will be further assumed that the housing 1 is a mechanical protection for the slab 3. With such assumptions, the device acts as a mere local temperature threshold indicator. Any change of temperature will be transmitted to the indicator U without delay from the time instant of the change and, when the temperature on he slab exceeds the critical point defined by the Curie point of the slab material, the sudden peak of electrical current will produce a sudden stroke of the needle of the indicator.

As it is this elevation to a critical temperature which is important, the member U may advantageously be replaced or completed by an alarm indicating member, as provided for instance by a high impedance, highly sensitive relay, the threshold of actuation of which is adjusted for the peak amplitude of the current released by the slab when its temperature exceeds the Curie temperature thereof. The contacts of said relay may then light or sound an alarm and further contacts of the same relay may be used, when needed, to close electrical circuits actuating members adapted to eliminate the cause of the overheating of the slab; for instance, actuation of circuit-breakers, release of fire extinguishers, etc.

It is however desirable to avoid spurious operation from transient heat waves. In this respect, provision is made so to condition the housing 1 of the slab that a certain delay is ensured for the heating of the slab when said housing is externally heated. This may be easily done by appropriately choosing the material and the thickness of the walls of said housing to cause a delay in the rise in temperature of the slab.

The condenser 8 is in shunt across the slab. Its purpose is two-fold. A ceramic body of the character described presents, at the Curie temperature thereof, an electrical resistance higher than 500 megohms but only a very low capacity, of the order for instance of 1000 picofarads as it is of small dimensions. The time constant proper of the slab is squite short and, for the values of the electric charges as defined herein above, the potential difference across the electrodes at the Curie temperature may easily exceed 5,000 volts which would disrupt the ceramic body. Providing the said shunt condenser with a suitable value will avoid this danger. For a capacity of 1000 picofarads of the slab, the value of the condenser 8 may be for instance 50,000 picofarads without inconvenience. The whole dimension will remain quite reduced. Of course, the overall insulation of the electrical circuitry must be carefully established at a high value, for instance at least 10,000 megohms.

The other purpose of condenser 8 is to store, when required, an electrical charge sufficient for the actuation of the current responsive member U, i.e. when the switch 10 is actually inserted in one lead f and is closed for intermittently verifying the condition of the ceramic slab or for enabling at a required time instant the current responsive member to be actuated if the slab has been heated before the closure of the switch. In such cases, a memorization is useful and this is ensured by storing the electrical charge from the slab into said shunt condenser whereby the time constant of the circuit may be adequately provided for such a timed operation of the device. One practical application of such a scheme is found in remote multiple indication and alarm systems at several places where are located an equal number of thermal threshold responsive devices.

As suggested hereinbefore, the invention may find advantageous uses when a remote or delayed action must be provided, which action is initiated by a controlled heating of the slab. A good example is the provision of a firing device for a quick-match of a projectile, as shown in FIG. 2. The ceramic slab 3 is placed on one wall of a housing 1 constituting a stopper threaded within the bottom of a projectile. The slab 3 is maintained applied against said wall by means of a leaf spring 6 pressed by an insulating cap 4 through which passes a load 7 connected to said metallic leaf spring 6 contacting one electrode of the slab 3. The other electrode of the slab is contacting the conducting wall of the stopper 1, which acts as a common ground for the slab 3 and the shunt condenser 8. An insulating sleeve 5 completes the assembly of the slab within its housing. The conducting lead 7, through two series connected switches 9 and 10, reaches a wire filament 11 located within the quick-match 12 of the explosive charge of the projectile, not otherwise shown in the drawing.

Under the wall of housing 1 against which is applied the slab 3 is arranged a combustion charge 2 which will burn and heat the wall and consequently after the delay produced by the heating of said wall, the slab 3 attains a temperature exceeding the Curie temperature of the material of the slab. The delay is useful for both the safety of the crew and that of the piece of ordnance. The lighting of the combustion charge is ensured at the firing of the gun and said charge may be a conventional one in the projectile or may be specially provided for the heating of the slab, as the case may be.

The purpose of the switch 9 is to ensure safety when the projectile is stocked and handled. Said switch is closed at the instant of use of the projectile, either manually before introducing it within the gun or automatically during said operation or even only at the firing of the shot. The actuation of the switch is made correspondingly either by a push-button or by an inertia responsive member and the switch is of a self-locking contact kind. The switch 10, which is also of this kind, is closed only after a delay from the shot by automatic inertia-responsive means. At the time instant this switch closes, the ceramic slab 3 has already exceeded its Curie temperature and has produced the charge on condenser 8 so that an electrical current immediately passes from the discharge of said condenser through the wire filament 11 which is brought to "red" and ignites the quick-match 12. The use of a wire filament of low resistance is of advantage as an additional security against an inadvertent closure of the switches before the required instants as in such a case condenser 8 cannot be charged. However, if such action is not considered as imperative, the wire filament may be replaced by a mere spark-gap. In any case, the rise of the temperature of the wall 1 to the point at which the slab 3 is heated beyond its Curie temperature occurs in a time interval of about 10 to 20 milliseconds.

In the appended claims, the term "passive" as applied to an electric circuit refers to a circuit which does not include a source of electric current other than the thermal responsive device itself.

I claim:

1. A thermal threshold responsive device comprising in combination:
   a body of pyroelectric ceramic material having electrodes in electrical contact with opposite faces thereof, said ceramic material being of the type which is polarized to establish a difference of potential between said electrodes dependent upon the temperature of said body and, upon reaching the Curie point of said material, suddenly loses its polarization and releases a high electrical charge at said electrodes;
   housing means enclosing said body, said housing means including walls formed of thermally insulating material in order to regulate and delay the action of external heat on said body;
   means connected to said electrodes consisting of a closed passive electric circuit including a current responsive member and a condenser of substantial capacity with respect to the capacity of said body at the Curie temperature thereof, said condenser being shunt connected across said electrodes, and at least one switch with an external control connected in said circuit between said current responsive member and the point of connection of said condenser;
   and means for subjecting said body to a source of heat to vary the temperature of said body from a point below the Curie point to a temperature above the Curie point; whereby whenever said body is heated to a temperature which exceeds its ferroelectric Curie point, a sudden current flows in said circuit to energize said current responsive member.

2. Device according to claim 1, wherein the device includes a source of heat in heat-exchange relation to said body and with activation control means therefor.

3. An explosive projectile comprising in combination:
   a body of pyroelectric ceramic material having electrodes in electrical contact with opposite faces thereof;
   a passive series electric circuit including a normally open switch and a current responsive heat producing means, said circuit being connected to said electrodes;
   a quick-match in direct heat exchange relation to said current responsive heat producing means;
   a combustible powder charge in heat exchange relation to said body, said charge being ignitable when the projectile is fired;
   and means for closing said switch when said projectile is fired.

4. The combination defined by claim 3 and including a condenser connected directly across said electrodes.

5. The combination as defined by claim 3, wherein a portion of the projectile comprises one of said electrodes and said body is spring-pressed thereagainst.

6. Device according to claim 3 wherein a further normally open switch is inserted in series with said normally open switch, said further switch being automatically closed a predetermined time after the first switch.

7. Device according to claim 3 wherein said current responsive heat producing means comprises a low resistance wire filament.

8. Device according to claim 3, wherein said current responsive heat producing means comprises a sparkgap.

References Cited

UNITED STATES PATENTS

| | | | |
|---|---|---|---|
| 2,764,091 | 9/1956 | Hudson et al. | 102—70.2 |
| 2,842,345 | 7/1958 | Brown | 257—3 |
| 2,985,759 | 5/1961 | Goldsmith | 310—4 |
| 2,991,716 | 7/1961 | Israel et al. | 102—70.2 |
| 3,101,054 | 8/1963 | Stevenson et al. | 102—60 |
| 3,200,745 | 8/1965 | Downs | 102—70.2 |

OTHER REFERENCES

Megaw: Ferroelectricity in Crystals, Methuen & Co., Ltd., London, 1957, pp. 32, 111 and 112.

BENJAMIN A. BORCHELT, *Primary Examiner.*

SAMUEL FEINBERG, *Examiner.*

W. C. ROCH, *Assistant Examiner.*

UNITED STATES PATENT OFFICE
CERTIFICATE OF CORRECTION

Patent No. 3,323,459            June 6, 1967

Paul Buffet

It is hereby certified that error appears in the above numbered patent requiring correction and that the said Letters Patent should read as corrected below.

Column 1, line 42, for "85" read -- 75 --.

Signed and sealed this 9th day of July 1968.

(SEAL)
Attest:

Edward M. Fletcher, Jr.            EDWARD J. BRENNER
Attesting Officer                 Commissioner of Patents